US008811976B2

(12) United States Patent
Iwamura et al.

(10) Patent No.: US 8,811,976 B2
(45) Date of Patent: Aug. 19, 2014

(54) MOBILE COMMUNICATION METHOD, MOBILE STATION, AND RADIO BASE STATION

(75) Inventors: Mikio Iwamura, Tokyo (JP); Hiroyuki Ishii, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 76 days.

(21) Appl. No.: 13/577,673

(22) PCT Filed: Feb. 8, 2011

(86) PCT No.: PCT/JP2011/052665
§ 371 (c)(1),
(2), (4) Date: Oct. 8, 2012

(87) PCT Pub. No.: WO2011/096578
PCT Pub. Date: Aug. 11, 2011

(65) Prior Publication Data
US 2013/0023264 A1    Jan. 24, 2013

(30) Foreign Application Priority Data
Feb. 8, 2010    (JP) ................................ 2010-025856

(51) Int. Cl.
*H04W 4/00* (2009.01)
(52) U.S. Cl.
USPC ....................................... 455/422.1; 370/252
(58) Field of Classification Search
CPC ... H04W 4/02; H04W 24/10; H04W 36/0094; H04W 48/16
USPC ................ 455/422.1, 434, 450; 370/252, 331
See application file for complete search history.

(56) References Cited

U.S. PATENT DOCUMENTS

2012/0263054 A1* 10/2012 Kazmi et al. .................. 370/252

OTHER PUBLICATIONS

International Search Report w/translation from PCT/JP2011/052665 dated Mar. 15, 2011 (2 pages).
3GPP TS 36.133 V9.2.0; "3rd Generation Partnership Project; Technical Specification Group Radio Access Network; Evolved Universal Terrestrial Radio Access (E-UTRA); Requirements for support of radio resource management (Release 9)"; Dec. 2009 (7 pages).
3GPP TSG-RAN WG2 #66bis, R2-093877; "Discussion on Measurement for CA"; LG Electronics Inc.; Los Angeles, USA, Jun. 29-Jul. 3, 2009 (4 pages).
3GPP TS 36.331 V11.0.0; "3rd Generation Partnership Project; Technical Specification Group Radio Access Network; Evolved Universal Terrestrial Radio Access (E-UTRA); Radio Resource Control (RRC); Protocol specification (Release 11)"; Jun. 2012 (302 pages).

* cited by examiner

*Primary Examiner* — Sam Bhattacharya
(74) *Attorney, Agent, or Firm* — Osha Liang LLP

(57) ABSTRACT

A mobile communication system according the present invention including a mobile station UE configured to detect a cell using CC with a measurement target frequency designated by the radio base station eNB, in a measurement gap designated by the radio base station eNB within a predetermined time period TIdentify_Inter, and when the mobile station UE is not performing CA, the predetermined time period TIdentify_Inter is determined based on the number Nfreq of the CCs with the measurement target frequencies, and when the mobile station UE is performing CA, the predetermined time period TIdentify_Inter is determined based on the number Nfreq of the CCs with the measurement target frequencies and the number M of CCs in each of which the measurement gap is set.

6 Claims, 8 Drawing Sheets

FIG. 4

MeasConfig

```
MeasConfig ::=        SEQUENCE {
    -- Measurement objects
    measObjectToRemoveList           MeasObjectToRemoveList       OPTIONAL,   -- Need ON
    measObjectToAddModList           MeasObjectToAddModList       OPTIONAL,   -- Need ON
    -- Reporting configurations
    reportConfigToRemoveList         ReportConfigToRemoveList     OPTIONAL,   -- Need ON
    reportConfigToAddModList         ReportConfigToAddModList     OPTIONAL,   -- Need ON
    -- Measurement identities
    measIdToRemoveList               MeasIdToRemoveList           OPTIONAL,   -- Need ON
    measIdToAddModList               MeasIdToAddModList           OPTIONAL,   -- Need ON
    -- Other paramenters
    quantityConfig                   QuantityConfig               OPTIONAL,   -- Need ON
A  { measGapConfig                   MeasGapConfig                OPTIONAL,   -- Need ON
    s-Measure                        RSRP-Range                   OPTIONAL,   -- Need ON
    preRegistrationInfoHRPD          PreRegistrationInfoHRPD      OPTIONAL,   -- Need OP  }
    speedStatePars           CHOICE {
        release                          NULL,
        setup                            SEQUENCE {
            mobilityStateParameters          MobilityStateParameters,
            timeToTrigger-SF                 SpeedStateScaleFactors
        }
    }                                                             OPTIONAL,   -- Need ON
    ...,
B  {  [[ measGapConfigList-r10          MeasGapConfigList-r10        OPTIONAL    -- Need ON  ]]
    }
```

FIG. 5

MeasGapConfig

```
MeasGapConfig  ::=          CHOICE {
    release                     NULL,
    setup                       SEQUENCE {
        gapOffset                   CHOICE {
            gp0                         INTEGER (0..39),
            gp1                         INTEGER (0..79),
            ...
        }
    }
}
```

FIG. 6

MeasGapConfigList-r10

```
MeasGapConfigList-r10  ::=   SEQUENCE (SIZE (1..8)) OF  MeasGapConfig-v10x0

MeasGapConfig-v10x0  ::=     SEQUENCE {
    measGapConfig                MeasGapConfig,
    cc-id                        INTEGER (0..7)
}
```

FIG. 11

$$T_{Identify\_Inter} = T_{Basic\_Identify\_Inter} \cdot \frac{480}{T_{Inter1}} \cdot N_{freq} \text{ ms}$$

Where:
$T_{Basic\_Identify\_Inter}$ = 480 ms. It is the time period used in the inter frequency equation where the maximum allowed time for the UE to identify a new FDD inter-frequency cell is defined.

FIG. 12

| Gap Pattern Id | Measurement Gap Length (MGL,ms) | Measurement Gap Repetition period (MGRP,ms) | Minimum available time for inter-frequency and inter-RAT measurements during 480ms period (Tinter1,ms) | Measurement Purpose |
|---|---|---|---|---|
| 0 | 6 | 40 | 60 | Inter-Frequency E-UTRAN FDD and TDD,UTRAN FDD,GERAN,LCR TDD, HRPD,CDMA2000 1x |
| 1 | 6 | 80 | 30 | Inter-Frequency E-UTRAN FDD and TDD,UTRAN FDD,GERAN,LCR TDD, HRPD,CDMA2000 1x |

MOBILE COMMUNICATION METHOD, MOBILE STATION, AND RADIO BASE STATION

TECHNICAL FIELD

The present invention relates to a mobile communication method, a mobile station, and a radio base station.

BACKGROUND ART

In the LTE (Long Term Evolution) standard whose specification is being developed by the 3GPP, a mobile station UE performing communications by using a carrier with a carrier frequency F1 is configured to perform measurement on a measurement target frequency F2 within a measurement gap in the carrier with the carrier frequency F1, as shown in FIG. 13.

An information element "MeasGapConfig" in "MeasConfig" transmitted by a radio base station eNB is configured to designate such measurement gap.

Here, in section 8.1.2.3.1.1 of the 3GPP TS 36.133, the LTE standard requires fulfillment of a requirement, as a system performance, that "a mobile station UE must detect a cell (an inter-frequency cell, a different carrier cell) using a CC with a measurement target frequency designated by a radio base station eNB, in a measurement gap designated by the radio base station eNB within a predetermined time period TIdentify_Inter.

Similarly, in another section in the 3GPP TS 36.133, the LTE standard requires fulfillment of a requirement that the mobile station US must detect a cell (an inter-RAT cell, a different RAT cell) using a radio access technology (RAT) of a measurement target designated by a radio base station eNB.

In addition, in the LTE-Advanced standard whose specification is being developed by the 3GPP, studies on "CA (Carrier Aggregation)" are being advanced.

The mobile station UE performing CA is configured to perform communications with the radio base station eNB by using multiple "Component Carriers (CC)" with different carrier frequencies.

SUMMARY OF THE INVENTION

Problems to be Solved by the Invention

However, the above-described requirements are provided on the assumption that a mobile station UE does not perform CA. Thus, when the mobile station UE is performing CA, a problem arises that a desired system performance cannot be achieved in the LTE technology even though the above-described requirements are fulfilled.

Hence, the present invention has been made in view of the foregoing problem. Accordingly, an objective of the invention is to provide a mobile communication method, a mobile station, and a radio base station which are capable of achieving a desired system performance in the LTE technology regardless of whether a mobile station UE is performing CA.

Means for Solving the Problem

The first characteristic of the present invention is a mobile communication system including a mobile station configured to be capable of performing communication with a radio base station by using a plurality of carriers with different carrier frequencies, wherein the mobile station is configured to detect a cell using a carrier with a measurement target frequency designated by the radio base station, in a measurement gap designated by the radio base station within a predetermined time period, and when the mobile station is not performing communication using the plurality of carriers, the predetermined time period is determined based on the number of carriers with the measurement target frequencies, and when the mobile station is performing communication using the plurality of carriers, the predetermined time period is determined based on the number of carriers with the measurement target frequencies and the number of carriers in each of which the measurement gap is set.

The second characteristic of the present invention is a mobile station configured to be capable of performing communication with a radio base station by using a plurality of carriers with different carrier frequencies, wherein the mobile station is configured to detect a cell using a carrier with a measurement target frequency designated by the radio base station, in a measurement gap designated by the radio base station within a predetermined time period, and when the mobile station is not performing communication using the plurality of carriers, the predetermined time period is determined based on the number of carriers with the measurement target frequencies, and when the mobile station is performing communication using the plurality of carriers, the predetermined time period is determined based on the number of carriers with the measurement target frequencies and the number of carriers in each of which the measurement gap is set.

The third characteristic of the present invention is A radio base station, including: a transmitter unit configured to send a mobile station measurement configuration information designating a predetermined measurement gap to be set and a carrier with a measurement target frequency, wherein the transmitter unit is configured to determine the predetermined measurement gap and the carrier with the measurement target frequency so as to allow the mobile station to detect a cell using the carrier with the measurement target frequency in the predetermined measurement gap within a predetermined time period, and when the mobile station is performing communication using a plurality of carriers with different carrier frequencies, the predetermined time period is determined based on the number of carriers with the measurement target frequencies, and when the mobile station is not performing communication using the plurality of carriers, the predetermined time period is determined based on the number of carriers with the measurement target frequencies and the number of carriers in each of which the measurement gap is set.

Effects of the Invention

As described above, the present invention can provide a mobile communication method, a mobile station, and a radio base station which are capable of achieving a desired system performance in the LTE technology regardless of whether a mobile station UE is performing CA.

BRIEF DESCRIPTION OF THE DRAWINGS

FIG. 4 is a drawing showing an example of an information element contained in "MeasConfig" transmitted by the radio base station eNB according to the first embodiment of the invention.

FIG. 5 is a drawing showing an example of an information element contained in "MeasConfig" transmitted by the radio base station eNB according to the first embodiment of the invention.

FIG. 6 is a drawing showing an example of an information element contained in "MeasGapConfigList-r10" in "MeasConfig" transmitted by the radio base station eNB according to the first embodiment of the invention.

FIG. 11 is a drawing for illustrating an example of a performance requirement in the mobile communication system according to the first embodiment of the invention.

FIG. 12 is a drawing for illustrating an example of a performance requirement in the mobile communication system according to the first embodiment of the invention.

MODE FOR CARRYING OUT THE INVENTION

Mobile Communication System According to First Embodiment of the Invention

Referring to FIGS. 1 to 12, a mobile communication system according to a first embodiment of the present invention is described. The mobile communication system according to the present embodiment is a mobile communication system in the LTE-Advanced standard.

Figure 1:
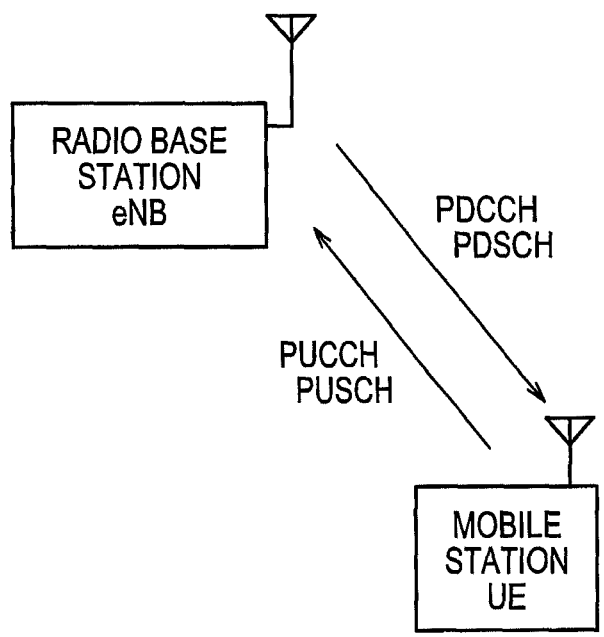
FIG. 1 is an entire configuration diagram of a mobile communication system according to a first embodiment of the present invention.

As shown in FIG. 1, in the mobile communication system according to the present embodiment, a mobile station UE is configured to transmit a control signal to a radio base station eNB via PUCCH (Physical Uplink Control Channel) and transmit a data signal to a radio base station eNB via PUSCH (Physical Uplink Shared Channel).

Also, in the mobile communication system according to the present embodiment, the radio base station eNB is configured to transmit a control signal to the mobile station UE via PDCCH (Physical Downlink Control Channel) and transmit a data signal to the mobile station UE via PDSCH (Physical Downlink Shared Channel).

Figure 2:
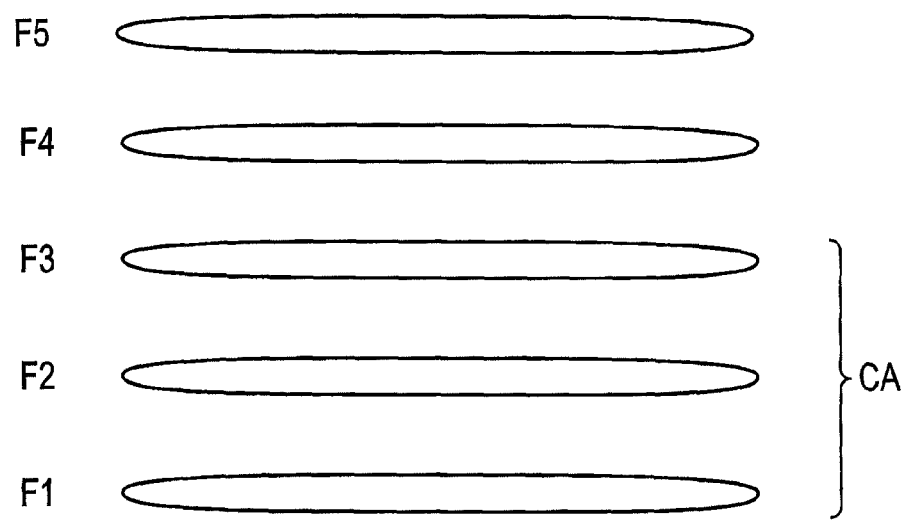
FIG. 2 is a drawing for illustrating a CA performed in the mobile communication system according to the first embodiment of the invention.

In addition, as shown in FIG. 2, the mobile communication system according to the present embodiment is configured to use multiple CCs with carrier frequencies F1 to F5. Here, in the mobile communication system according to the present embodiment, the mobile station UE can perform CA using the predetermined number of CCs (in the example of FIG. 2, for example, three CCs with the carrier frequencies F1 to F3).

Figure 3:
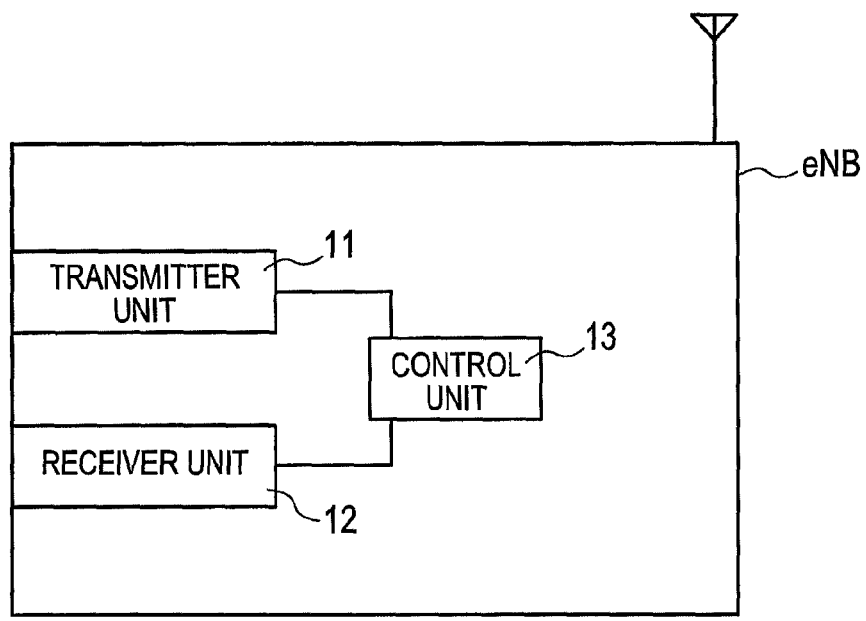
FIG. 3 is a functional block diagram of a radio base station according to the first embodiment of the invention.

As shown in FIG. 3, the radio base station eNB includes a transmitter unit 11, a receiver unit 12, and a control unit 13.

The transmitter unit 11 is configured to transmit "MeasConfig" as a RRC (Radio Resource Control) information element to the mobile station UE via the PDSCH.

FIG. 4 shows an example of information elements contained in such "MeasConfig."

Here, the transmitter unit 11 is configured to designate a measurement target frequency in the mobile station UE through information elements "MeasObjectToRemoveList" and "MeasObjectToAddModList."

Also, the transmitter unit 11 is configured to designate a transmission condition for a measurement report in the mobile station UE through the information elements "ReportConfigToRemoveList" and "ReportConfigToAddModList."

In addition, the transmitter unit 11 is configured to inform the mobile station UE supporting the LTS standard (Rel.8/Rel.9) of a designation of a measurement gap to be set in the mobile station UE through the information element "MeasGapConfig (A shown in FIG. 4)."

Specifically, as shown in FIG. 5, the transmitter unit 11 is configured to set any of "gp0" and "gp1" for the information element "gapOffset" in "MeasGapConfig."

Here, when "gp0" is set for "gapOffset", a measurement gap time period is "40 ms" and a measurement gap start position is a sub-frame specified by a value (0 to 39) set as "INTEGER".

On the other hand, when "gp1" is set for "gapOffset", a measurement gap time period is "80 ms" and a measurement gap start position is a sub-frame specified by a value (0 to 79) set as "INTEGER".

Note that the mobile station UE supporting the LTE standard (Rel.8/Rel.9) does not support CA, that is, it cannot perform communication by using multiple CCs. Accordingly, in "MeasGapConfig", the radio base station eNB does not need to specify CC in which a measurement gap should be set.

On the other hand, the transmitter unit 11 is configured to inform the mobile station UE supporting the LTE standard (Rel.10) of a designation of a measurement gap to be set in the mobile station UE through the information element "MeasGapConfigList-r10 (B shown in FIG. 4)."

Here, the transmitter unit 11 may be configured to designate a measurement gap to be set in the mobile station UE through "MeasGapConfigList-r10 (B shown in FIG. 4)" only when the mobile station UE supporting the LTE standard (Rel.10) is performing CA.

In other words, the transmitter unit 11 may be configured to designate a measurement gap to be set in the mobile station UE through "MeasGapConfig (A shown in FIG. 4)" when the mobile station UE supporting the LTE standard (Rel.10) is not performing CA.

Specifically, the transmitter unit 11 is configured such that identification information on CC in which a measurement gap should be set is designated in the information element "cc–id" in "MeasGapConfigList-r10", as shown in FIG. 6.

Note that the information element "MeasGapConfig" set for "MeasGapCOnfigList-r10" is identical to the information element "MeasGapConfig" shown in FIG. 5.

Accordingly, the transmitter unit 11 can designate a measurement gap to be set in the mobile station UE by designating a combination of the CC and the measurement gap (the time period and the start position) through the information elements "cc–id" in "MeasGapConfigList-r10" and "MeasGapConfig."

Note that, in the example of FIG. 6, up to 8 combinations of CCs and measurement gaps (time periods and start positions) can be set for "MeasGapConfigList-r10".

Also, "MeasGapConfig" designated by "MeasGapConfigList-r10" may be commonly used among the multiple CCs. In other words, the same time period and start position of the measurement gap may be commonly applied to the multiple CCs. In addition, the start position of the measurement gap may be fixedly offset for each CC.

The receiver unit 12 is configured to receive "Measurement Report" transmitted by the mobile station UE.

The control unit 13 is configured to determine if the mobile station UE should perform a handover based on the "Measurement Report" received by the receiver unit 12.

Also, the control unit 13 is configured to notify the transmitter unit 11 of whether the mobile station UE supports the LTE standard (Rel.10) or whether the mobile station UE is performing CA.

Figure 7:
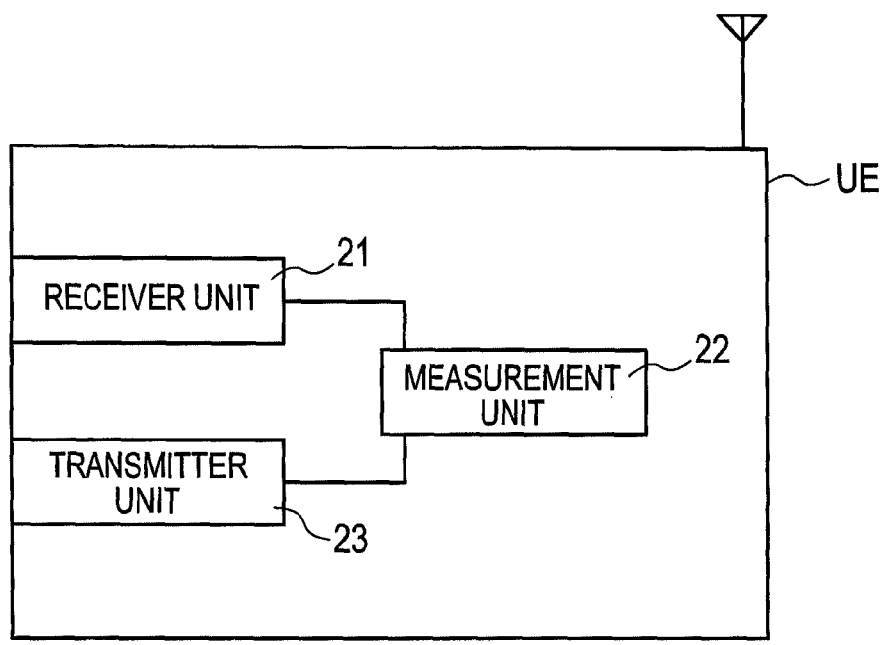
FIG. 7 is a functional block diagram of a mobile station according to the first embodiment of the invention.

As shown in FIG. 7, the mobile station UE includes a receiver unit 21, a measurement unit 22, and a transmitter unit 23.

The receiver unit 21 is configured to receive "MeasConfig" transmitted by the radio base station eNB.

The measurement unit 22 is configured to perform measurement designated by the radio base station eNB based on "MeasConfig" transmitted by the radio base station eNB.

Specifically, the measurement unit 22 is configured to perform measurement on a measurement target frequency designated by "MeasConfig" in the measurement gap designated by "MeasConfig".

Figure 8:
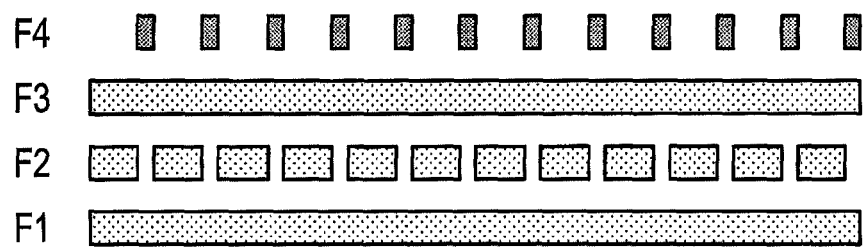
FIG. 8 is a drawing for illustrating an example of inter-F/RAT measurement performed by the mobile station according to the first embodiment of the invention.

For example, in a case where "F4" is designated as a measurement target frequency through "MeasConfig," and "MeasConfig" designates that a measurement gap should be set in CC with the carrier frequency F2 (i.e., when "cc-id=F2" is set in "MeasGapConfigList-r10") when the mobile station UE is performing CA using carriers with carrier frequencies F1 to F3, as shown in FIG. 8, the measurement unit 22 is configured to perform measurement on the frequency F4 in the measurement gap in the CC with the carrier frequency F2.

Figure 9:
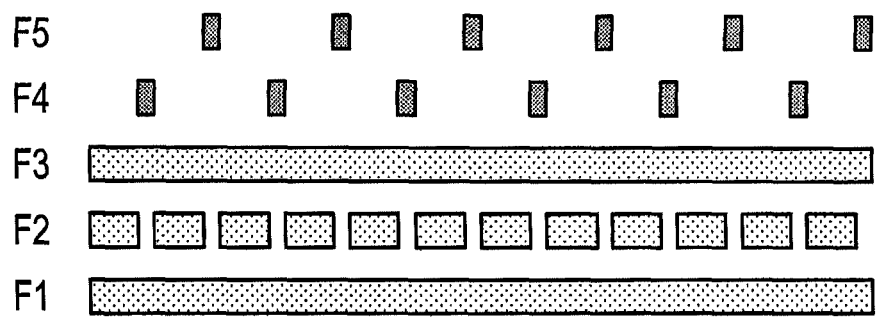
FIG. 9 is a drawing for illustrating an example of inter-F/RAT measurement performed by the mobile station according to the first embodiment of the invention.

Also, in a case where "F4" and "F5" are designated as measurement target frequencies through "MeasConfig," and "MeasConfig" designates that a measurement gap should be set in CC with the carrier frequency F2 (i.e., when "cc-id=F2" is set in "MeasGapConfigList-r10") when the mobile station UE is performing CA using the carriers of the carrier frequencies F1 to F3, as shown in FIG. 9, the measurement unit 22 is configured to perform measurement on the frequencies F4 and F5 in the measurement gap in the CC with the carrier frequency F2.

Figure 10:
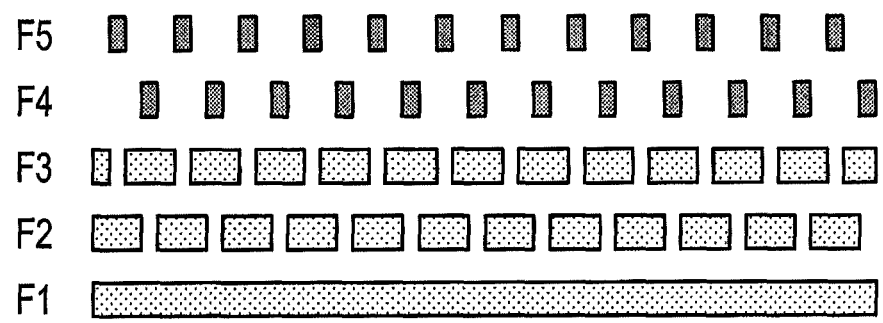
FIG. 10 is a drawing for illustrating an example of inter-F/RAT measurement performed by the mobile station according to the first embodiment of the invention.
Figure 13:
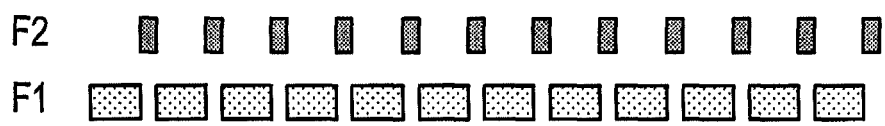
FIG. 13 is a drawing for illustrating an example of inter-F/RAT measurement performed by a conventional mobile station.

Furthermore, in a case where "F4" and "F5" are designated as measurement target frequencies through "MeasConfig," and "MeasConfig" designates that a measurement gap should be set in CCs with the carrier frequencies F2 and F3 (i.e., when "cc-id=F2" and "cc-id=F3" are set in "MeasGapConfigList-r10") when the mobile station UE is performing CA using the carriers with the carrier frequencies F1 to F3, as shown in FIG. 10, the measurement unit 22 is configured to perform measurement on the frequencies F4 and F5 in the measurement gap in the CCs with the carrier frequencies F2 and F3.

Here, the measurement unit 22 may be configured to implicitly release the measurement gap applied to the specific CC when the specific CC is deleted from the CA target CCs.

The transmitter unit 23 is configured to transmit "Measurement Report" containing such measurement result to the radio base station eNB when the above-described measurement result fulfils the report condition designated by "MeasConfig".

Note that in the mobile communication system according to the present embodiment, in order to fulfill the requirement shown in section 8.1.2.3.1.1. of 3GPP TS 36.133, the mobile station UE is configured to detect a cell (a different carrier cell) using the CC with the measurement target frequency designated by the radio base station eNB, within the measurement gap designated by the radio base station eNB in the predetermined time period TIdentify_Inter.

Here, when the mobile station UE is not performing CA, the predetermined time period TIdentify_Inter is determined based on the number Nfreq of CCs with the measurement target frequencies.

Specifically, in such a case, the predetermined time period TIdentify_Inter is determined by FIG. 11. The "TBasic_Identify_Inter" is 480 ms and "TInter1" is a value which is determined by a measurement gap time period (a gap pattern) as shown in FIG. 12. For example, as shown in FIG. 12, when the measurement gap time period is "40 ms", "TInter1" is "60 ms", and when the measurement gap time period is "80 ms", "TInter1" is "30 ms".

On the other hand, when the mobile station UE is not performing CA, the predetermined time period TIdentify_Inter is determined based on the number Nfreq of CCs with the measurement target frequencies and the number M of CCs in each of which the measurement gap is set.

Specifically, in such a case, the predetermined time period TIdentify_Inter is determined according to FIG. 11.

Instead, when the mobile station UE is not performing CA, the predetermined time period TIdentify_Inter may be determined based on the number Nfreq of CCs with the measurement target frequencies, the number M of CCs in each of which the measurement gap is set, the number P of CCs simultaneously measurable by the mobile station UE, and the number of CCs used in the CA (i.e., the number of CCs aggregated in the CA).

Specifically, in such a case, the predetermined time period TIdentify_Inter is determined by FIG. 11.

For example, the number P of the CCs simultaneously measurable by the mobile station UE may be expressed as the number of receivers provided in the mobile station UE or may be expressed as the number of CCs usable in the CA (i.e., the number of CCs aggregatable in the CA).

Note that, "P−Q+M" is the number of unused receivers usable for actually measuring different carriers.

In order to fulfill such requirement, the transmitter unit 11 of the radio base station eNB may be configured to determine a predetermined measurement gap and CC with a measurement target frequency so that the mobile station UE can detect a cell using CC with the measurement target frequency, in the predetermined measurement gap within the predetermined time period TIdentify_Inter.

The mobile communication system according to the present embodiment can achieve a desired system performance in the LTE technology regardless of whether the mobile station UE is performing CA by switching a calculation method of the predetermined time period TIdentify_Inter used when the mobile station UE is not performing CA and a calculation method of the predetermined time period TIdentify_Inter used when the mobile station UE is performing CA.

The characteristics of the above-described embodiment may be expressed as follows.

A first characteristic of the present embodiment is a mobile communication system including a mobile station UE configured to be capable of performing communication (CA) with a radio base station eNB by using multiple CCs (carriers) with different carrier frequencies, in which the mobile station UE is configured to detect a cell using CC with a measurement target frequency designated by the radio base station eNB, in a measurement gap designated by the radio base station eNB within a predetermined time period TIdentify_Inter, and when the mobile station UE is not performing CA, the predetermined time period TIdentify_Inter is determined based on the number Nfreq of the CCs with the measurement target frequencies, and when the mobile station UE is performing CA, the predetermined time period TIdentify_Inter is determined based on the number Nfreq of the CCs with the measurement target frequencies and the number M of CCs in each of which the measurement gap is set.

In the first characteristic of the present embodiment, when the mobile station UE is performing CA, the predetermined time period TIdentify_Inter may be determined based on the number Nfreq of CCs with the measurement target frequencies and the number M of CCs in each of which the measurement gap is set, the number P of CCs simultaneously measurable by the mobile station UE, and the number Q of CCs used in the CA.

A second characteristic of the present embodiment is a mobile station UE configured to be capable of performing CA with a radio base station eNB, in which the mobile station UE is configured to detect a cell using CC with a measurement target frequency designated by a radio base station eNB, in a measurement gap designated by the radio base station eNB within a predetermined time period TIdentify_Inter, and when the mobile station UE is not performing CA, the predetermined time period TIdentify_Inter is determined based on the number Nfreq of CCs with the measurement target frequencies, and when the mobile station UE is performing CA, the predetermined time period TIdentify_Inter is determined based on the number Nfreq of CCs with the measurement target frequencies and the number M of CCs in each which the measurement gap is set.

In the second characteristic of the present embodiment, when the mobile station UE is performing CA, the predetermined time period TIdentify_Inter may be determined based on the number Nfreq of CCs with the measurement target frequencies, the number M of CCs in each of which the measurement gap is set, the number P of CCs simultaneously measurable by the mobile station UE, and the number Q of CCs used in the CA.

A third characteristic of the present embodiment is a radio base station eNB including a transmitter unit 11 configured to send a mobile station UE "MeasConfig (measurement configuration information)" designating a predetermined measurement gap to be set and CC with a measurement target frequency, in which the transmitter unit 11 is configured to determine the predetermined measurement gap and CC with the measurement target frequency so that the mobile station UE can detect a cell using CC with a measurement target frequency, in the predetermined measurement gap within the predetermined time period TIdentify_Inter, and when the mobile station UE is not performing CA, the predetermined time period TIdentify_Inter is determined based on the number Nfreq of CCs with the measurement target frequencies, and when the mobile station UE is performing CA, the predetermined time period TIdentify_Inter is determined based on the number Nfreq of CCs with the measurement target frequencies and the number M of CCs in each of which the measurement gap is set.

In the third characteristic of the present embodiment, when the mobile station UE is performing CA, the predetermined time period TIdentify_Inter may be determined based on the number Nfreq of CCs with the measurement target frequencies and the number M of CCs in each of which the measurement gap is set, the number P of CCs simultaneously measurable by the mobile station UE, and the number Q of CCs used in the CA.

Note that the above described operations of the mobile station UE and the radio base station eNB may be implemented by hardware, may be implemented by a software module executed by a processor, or may be implemented by a combination of both.

The software module may be provided in any form of a recording medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such recording medium is connected with the processor so that the processor can read and write information on the recording medium. Also, such recording medium may be integrated on the processor. Or, such recording medium and processor may be provided inside ASIC. Such ASIC may be provided inside the mobile station UE and the radio base station eNB. Or, such recording medium and processor maybe provided inside the mobile station UE and the radio base station eNB as a discrete component.

As described above, the present invention has been described in detail using the above-described embodiment. However, it is apparent for those skilled in the art that the present invention is not limited to the embodiment described herein. The present invention can be implemented as altered and modified embodiments without departing from the scope and spirit thereof, which are defined by the description in the scope of claims. Accordingly, the description herein is provided only for illustrative purposes and does not impose any limitation on the invention.

INDUSTRIAL APPLICABILITY

As described above, the present invention can provide a mobile communication method, a mobile station, and a radio base station which are capable of achieving a desired system performance in the LTE technology regardless of whether a mobile station UE is performing CA.

EXPLANATION OF THE REFERENCE NUMERALS

UE . . . mobile station
eNB . . . radio base station
11, 23 . . . transmitter unit
12, 21 . . . receiver unit
13 . . . control unit
22 . . . measurement unit

The invention claimed is:

1. A mobile communication system comprising a mobile station configured to be capable of performing communication with a radio base station by using a plurality of carriers with different carrier frequencies, wherein
   the mobile station is configured to detect a cell using a carrier with a measurement target frequency designated by the radio base station, in a measurement gap designated by the radio base station within a predetermined time period, and
   when the mobile station is not performing communication using the plurality of carriers, the predetermined time period is determined based on the number of carriers with the measurement target frequencies, and
   when the mobile station is performing communication using the plurality of carriers, the predetermined time period is determined based on the number of carriers with the measurement target frequencies and the number of carriers in each of which the measurement gap is set.

2. The mobile communication system according to claim 1, wherein when the mobile station is performing communication using the plurality of carriers, the predetermined time period is determined based on the number of carriers with the measurement target frequencies, the number of carriers in each of which the measurement gap is set, the number of carriers simultaneously measurable by the mobile station, and the number of carriers used in the communication.

3. A mobile station configured to be capable of performing communication with a radio base station by using a plurality of carriers with different carrier frequencies, wherein the mobile station is configured to detect a cell using a carrier with a measurement target frequency designated by the radio base station, in a measurement gap designated by the radio base station within a predetermined time period, and when the mobile station is not performing communication using the plurality of carriers, the predetermined time period is determined based on the number of carriers with the measurement target frequencies, and when the mobile station is performing communication using the plurality of carriers, the predetermined time period is determined based on the number of carriers with the measurement target frequencies and the number of carriers in each of which the measurement gap is set.

4. The mobile station according to claim 3, wherein when the mobile station is performing communication using the plurality of carriers, the predetermined time period is determined based on the number of carriers with the measurement target frequencies, the number of carriers in each of which the measurement gap is set, the number of carriers simultaneously measurable by the mobile station, and the number of carriers used in the communication.

5. A radio base station, comprising:

a transmitter unit configured to send a mobile station measurement configuration information designating a predetermined measurement gap to be set and a carrier with a measurement target frequency, wherein the transmitter unit is configured to determine the predetermined measurement gap and the carrier with the measurement target frequency so as to allow the mobile station to detect a cell using the carrier with the measurement target frequency in the predetermined measurement gap within a predetermined time period, and when the mobile station is performing communication using a plurality of carriers with different carrier frequencies, the predetermined time period is determined based on the number of carriers with the measurement target frequencies, and when the mobile station is not performing communication using the plurality of carriers, the predetermined time period is determined based on the number of carriers with the measurement target frequencies and the number of carriers in each of which the measurement gap is set.

6. The radio base station according to claim 5, wherein when the mobile station is performing the communication using the plurality of carriers, the predetermined time period is determined based on the number of carriers with the measurement target frequencies, the number of carriers in each of which the measurement gap is set, the number of carriers simultaneously measurable by the mobile station, and the number of carriers used in the communication.

\* \* \* \* \*